United States Patent
Reitberger et al.

(10) Patent No.: US 10,139,043 B1
(45) Date of Patent: *Nov. 27, 2018

(54) FLASHLIGHT MOUNT

(71) Applicants: Paul Reitberger, Hopewell Junction, NY (US); Erick Reitberger, Hyde Park, NY (US)

(72) Inventors: Paul Reitberger, Hopewell Junction, NY (US); Erick Reitberger, Hyde Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,227

(22) Filed: Mar. 8, 2018

Related U.S. Application Data

(63) Continuation of application No. 15/730,968, filed on Oct. 12, 2017, now Pat. No. 9,945,510.

(51) Int. Cl.
  *F16M 11/40* (2006.01)
  *F16M 11/14* (2006.01)
  *F16M 13/02* (2006.01)

(52) U.S. Cl.
  CPC ............. *F16M 11/40* (2013.01); *F16M 11/14* (2013.01); *F16M 13/022* (2013.01)

(58) Field of Classification Search
  CPC ...... F16M 11/40; F16M 11/14; F16M 13/022; F16M 11/12; F21V 19/02
  USPC ... 248/160, 68.1, 558, 299.1, 455, 683, 548, 248/549, 467, 176.1, 206.5, 900
  See application file for complete search history.

(56) References Cited

U.S. PATENT DOCUMENTS

| | | | | | |
|---|---|---|---|---|---|
| 599,543 | A | * | 2/1898 | Whitaker | F16M 11/40 138/131 |
| 2,481,271 | A | * | 9/1949 | Willey | H04M 1/04 248/159 |
| 2,510,198 | A | * | 6/1950 | Tesmer | B23Q 1/285 248/160 |
| 4,238,816 | A | * | 12/1980 | Merlo | F21S 6/003 362/279 |
| 4,842,174 | A | * | 6/1989 | Sheppard | B60R 11/02 108/45 |

(Continued)

OTHER PUBLICATIONS

Toolup.com Professional Contractor Supplies, "Wood's Powr-Grip 91153 TL3AMB1420T114L 3" Vacuum Cup W Acc Mount 1/4-20 x 1/14" Stud," found: http://www.toolup.com/Woods-Powr-Grip-91153-TL3AMB1420T11 . . . on Nov. 2, 2017, pp. 1-3.

(Continued)

*Primary Examiner* — Muhammad Ijaz
(74) *Attorney, Agent, or Firm* — Saile Ackerman LLC; Stephen B. Ackerman

(57) ABSTRACT

A flashlight mount is provided comprising a modular, flexible mast capable of being positioned in any orientation, a clamp adaptor attached to an elbow joint at a first end of the flexible mast wherein a plurality of inner grooves are formed vertically on an inside surface wherein the elbow joint is rotatable 360 degrees relative to the flexible mast and wherein the clamp adaptor is rotatable 360 degrees relative to the elbow joint, and an inner ring having a plurality of outer grooves formed vertically on an outside surface of the inner ring wherein the inner grooves and outer grooves interlock wherein the inner ring is rotatable 360 degrees with respect to the clamp adaptor and an opening in the inner ring is configured to hold a flashlight.

20 Claims, 5 Drawing Sheets

(56) References Cited

U.S. PATENT DOCUMENTS

| | | | | |
|---|---|---|---|---|
| 4,907,137 A * | 3/1990 | Schladitz | F21V 21/32 | 362/145 |
| 4,907,769 A * | 3/1990 | Hunley, Jr. | F21V 21/06 | 248/122.1 |
| D321,062 S * | 10/1991 | Bonbright | D26/140 | |
| 5,103,384 A * | 4/1992 | Drohan | F16M 11/40 | 362/190 |
| 5,135,189 A * | 8/1992 | Ghazizadeh | F16M 11/40 | 248/104 |
| 5,144,546 A | 9/1992 | Burdi | | |
| 5,276,596 A * | 1/1994 | Krenzel | F16M 11/40 | 362/191 |
| 5,339,229 A * | 8/1994 | Snyder | F21V 21/08 | 362/190 |
| 5,383,633 A * | 1/1995 | Ellestad | F21V 21/08 | 239/270 |
| 5,592,749 A * | 1/1997 | Trimmer | A45D 20/14 | 219/541 |
| 5,699,988 A * | 12/1997 | Boettger | A61G 5/10 | 248/122.1 |
| 5,823,658 A * | 10/1998 | Doddy | F16M 11/40 | 362/191 |
| 5,842,670 A * | 12/1998 | Nigoghosian | A45D 20/12 | 248/160 |
| 5,881,983 A * | 3/1999 | Hofmann | A45D 20/12 | 248/176.1 |
| 5,937,537 A * | 8/1999 | Miller | A45D 20/12 | 248/160 |
| 6,099,133 A * | 8/2000 | Wright | A45D 42/12 | 359/879 |
| 6,142,486 A * | 11/2000 | Cedarberg, III | B23B 31/202 | 248/160 |
| 6,158,876 A * | 12/2000 | Birdwell | F21V 21/0925 | 362/191 |
| 6,227,263 B1 * | 5/2001 | Kust | F16N 31/002 | 141/86 |
| 6,409,131 B1 * | 6/2002 | Bentley | A01K 97/10 | 248/219.4 |
| 6,758,809 B2 * | 7/2004 | Briscoe | A61B 17/02 | 600/210 |
| 6,827,318 B1 * | 12/2004 | Hsu Li | B60R 11/00 | 224/558 |
| RE38,897 E * | 11/2005 | Krenzel | F16M 11/40 | 362/191 |
| 7,209,344 B2 * | 4/2007 | Hillman | F16M 11/08 | 248/917 |
| 7,218,510 B2 * | 5/2007 | Hillman | F16M 11/10 | 248/160 |
| 7,311,664 B2 * | 12/2007 | Goodman | A61B 17/02 | 600/228 |
| 7,665,698 B2 * | 2/2010 | Desorbo | F16M 11/14 | 248/187.1 |
| 7,731,138 B2 * | 6/2010 | Wiesner | A61M 5/1415 | 248/160 |
| 7,986,369 B1 * | 7/2011 | Burns | F16M 11/40 | 248/187.1 |
| 8,151,481 B2 * | 4/2012 | Perez, Jr. | A45D 20/14 | 248/160 |
| 8,296,886 B2 * | 10/2012 | Vestergaard | A47C 7/40 | 5/621 |
| 8,297,566 B2 * | 10/2012 | Bevirt | F16M 11/40 | 248/106 |
| 8,393,584 B2 * | 3/2013 | Burns | F16M 11/041 | 248/121 |
| 8,460,172 B2 * | 6/2013 | Meyer | A61B 17/0206 | 600/229 |
| 8,602,662 B1 * | 12/2013 | Mans | F16M 11/041 | 248/160 |
| 9,268,201 B1 * | 2/2016 | Montgomery | G03B 17/561 | |
| 9,395,037 B2 * | 7/2016 | Ballhatchet | A47F 5/0861 | |
| 9,562,626 B2 * | 2/2017 | Gustin | B64D 47/00 | |
| 9,625,089 B1 * | 4/2017 | Geer | F16M 13/02 | |
| 9,695,849 B2 * | 7/2017 | Zhou | F16M 11/041 | |
| 2001/0025905 A1 * | 10/2001 | Carpenter | A61B 17/02 | 248/160 |
| 2002/0162918 A1 * | 11/2002 | Suh | A61J 9/0692 | 248/104 |
| 2004/0047052 A1 * | 3/2004 | Zadro | A45D 42/16 | 359/855 |
| 2004/0089778 A1 * | 5/2004 | Valentine | F16M 11/40 | 248/229.13 |
| 2004/0155164 A1 * | 8/2004 | Richter | B60R 11/00 | 248/274.1 |
| 2004/0211868 A1 * | 10/2004 | Holmes | F16M 11/40 | 248/231.71 |
| 2004/0233623 A1 * | 11/2004 | Hillman | F16M 11/10 | 361/679.06 |
| 2005/0092875 A1 * | 5/2005 | Carnevali | F16M 11/40 | 248/160 |
| 2005/0092877 A1 * | 5/2005 | Carnevali | F16M 11/40 | 248/160 |
| 2005/0129459 A1 * | 6/2005 | Doubler | F16B 33/006 | 403/315 |
| 2005/0194501 A1 * | 9/2005 | Richter | F16M 11/40 | 248/160 |
| 2006/0289708 A1 * | 12/2006 | Lin | B60R 11/00 | 248/160 |
| 2008/0056808 A1 * | 3/2008 | Bevirt | F16M 11/40 | 403/56 |
| 2008/0302944 A1 * | 12/2008 | Freeman | F16M 11/40 | 248/558 |
| 2009/0101772 A1 * | 4/2009 | Bevirt | F16M 11/40 | 248/180.1 |
| 2009/0189039 A1 * | 7/2009 | LaBuda | F16M 11/40 | 248/231.81 |
| 2010/0252696 A1 * | 10/2010 | Sage | F16M 11/40 | 248/160 |
| 2011/0042536 A1 * | 2/2011 | Phillips | F16M 11/242 | 248/299.1 |
| 2013/0026316 A1 * | 1/2013 | Case | B62J 11/00 | 248/205.1 |
| 2014/0177239 A1 * | 6/2014 | Wyatt, III | F21V 19/00 | 362/382 |
| 2015/0080904 A1 * | 3/2015 | Kovarik | A01K 15/003 | 606/113 |
| 2015/0102189 A1 * | 4/2015 | Klamm | F16M 11/12 | 248/160 |
| 2015/0215483 A1 * | 7/2015 | Farnsworth | F16M 13/02 | 348/207.1 |
| 2015/0345698 A1 * | 12/2015 | Klamm | F16M 13/022 | 248/206.5 |
| 2015/0382489 A1 * | 12/2015 | Sorensen | G06F 1/16 | 248/558 |

OTHER PUBLICATIONS

Zoro.com, Flex Hose Segments, PK54 (/Loc-Lin-Flex-Hose-Segments—PK54-69540/I/G2581013/), Flexible Hose Systems, found: https://www.zoro.com/loc-line-flex-hose-segments-pk54-69540/i/G2 . . . on Nov. 2, 2017, pp. 1-11.

"Loc-Line-60531—Cutting Guard Shield Mounting Elbow," found: https://www.mscdirect.com/priduct/details/04877791?product_id=nv . . . on Nov. 2, 2017, pp. 1-2.

* cited by examiner

FLASHLIGHT MOUNT

This is a continuation application of U.S. Ser. No. 15/730,698 filed on Oct. 12, 2017, which is herein incorporated by reference in its entirety.

TECHNICAL FIELD

The disclosure relates to a flashlight mount, and more particularly, to a hands-free, portable flashlight mount.

BACKGROUND

There are many instances in which a hands-free flashlight mount is highly desirable. Especially if one is working in a confined area, a flashlight mount should also be flexible so that the flashlight can be shifted into any direction.

U.S. Pat. No. 5,144,546 (Burdi) and U.S. Pat. No. 4,907,769 (Hunley Jr. et al), and U.S. Patent Application 2004/0089778 (Valentine et al) show various flashlight mounts.

SUMMARY

A principal object of the present disclosure is to provide a hands-free, portable flashlight mount.

Another object of the disclosure is to provide a hands-free, portable, and flexible flashlight mount.

In accordance with the objects of the disclosure, a flashlight mount is provided comprising a suction cup base, a modular, flexible mast attached to the suction cup base at a first end wherein the modular, flexible mast is capable of being positioned in any orientation, a clamp adaptor attached to an elbow joint at a second end of the flexible mast wherein a plurality of inner grooves are formed vertically on an inside surface of the clamp adaptor wherein the elbow joint is rotatable 360 degrees relative to the flexible mast and wherein the clamp adaptor is rotatable 360 degrees relative to the elbow joint, and an inner ring having a plurality of outer grooves formed vertically on an outside surface of the inner ring wherein the inner grooves and outer grooves interlock wherein the inner ring is rotatable 360 degrees with respect to the clamp adaptor and an opening in the inner ring is configured to hold a flashlight.

Also in accordance with the objects of the disclosure, a method of fabricating a flashlight mount is provided. A mast base piece is mounted on a suction cup base. A first modular, flexible mast piece is attached to the mast base piece. One or more second modular, flexible mast pieces are attached vertically to underlying modular, flexible mast pieces until a desired mast length is reached wherein the modular, flexible mast is capable of being positioned in any orientation. An elbow joint is attached to a topmost second modular, flexible mast piece wherein the elbow joint is rotatable 360 degrees with respect to the topmost second modular, flexible mast piece. A clamp adaptor is mounted to the elbow joint wherein a plurality of inner grooves are formed vertically on an inside surface of the clamp adaptor and wherein the clamp adaptor is rotatable 360 degrees with respect to the elbow joint. An inner ring is mounted inside the clamp adaptor, the inner ring having a plurality of outer grooves formed vertically on an outside surface of the inner ring wherein the inner grooves and outer grooves interlock and an opening in the inner ring having a first diameter configured to receive a device having a second diameter wherein the inner ring is rotatable 360 degrees with respect to the clamp adaptor.

Also in accordance with the objects of the disclosure, a method of using a flashlight mount is provided. A flashlight mount is provided comprising a suction cup base, a modular, flexible mast attached to the suction cup base at a first end wherein the modular, flexible mast is capable of being positioned in any orientation, a clamp adaptor attached to an elbow joint at a second end of the flexible mast wherein a plurality of inner grooves are formed vertically on an inside surface of the clamp adaptor wherein the elbow joint is rotatable 360 degrees relative to the flexible mast and wherein the clamp adaptor is rotatable 360 degrees relative to the elbow joint, and an inner ring mounted inside the clamp adaptor, the inner ring having a plurality of outer grooves formed vertically on an outside surface of the inner ring wherein the inner grooves and outer grooves interlock, and an opening in the inner ring having a first diameter configured to receive a device having a second diameter wherein the inner ring is rotatable 360 degrees with respect to the clamp adaptor. The modular, flexible mast is shortened or lengthened as desired. The suction cup base is mounted onto any smooth surface. A device is inserted into the opening in the inner ring.

BRIEF DESCRIPTION OF THE DRAWINGS

In the accompanying drawings forming a material part of this description, there is shown.

DETAILED DESCRIPTION

Figure 1:
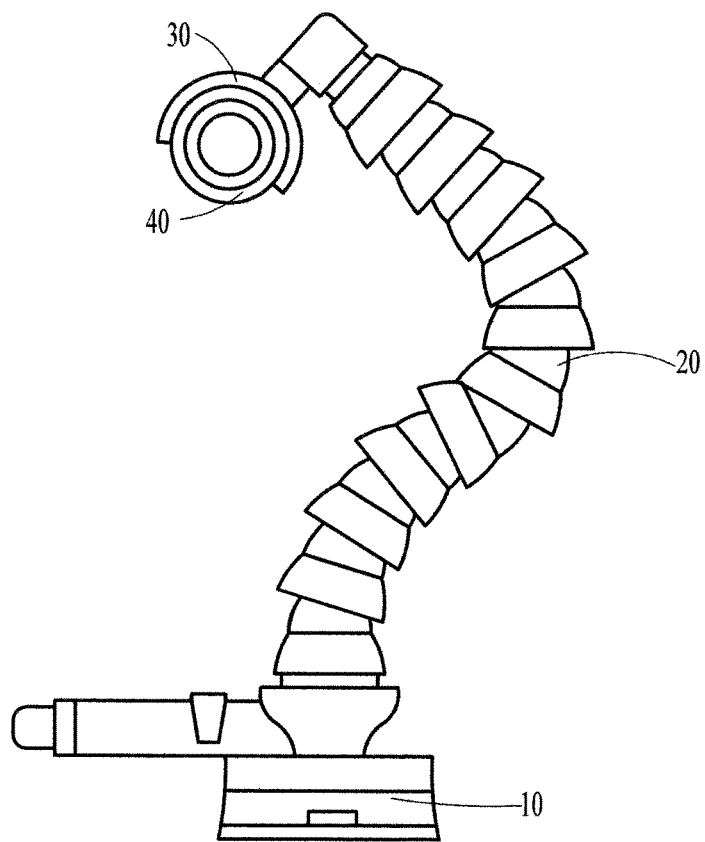
FIG. 1 is a side view of a preferred embodiment of the flashlight mount of the present disclosure.

This disclosure involves a hands-free, portable flashlight mount. Many flashlights have a 1" diameter, and the flashlight mount of the present disclosure is designed to accommodate flashlights or work lights having a 1" diameter. Referring to FIG. 1, the disclosed flashlight mount comprises a suction cup base 10, a flexible mast 20, and a clamp adaptor 30 with inner ring 40. The flashlight mount can be mounted to any smooth surface, wet or dry.

Figure 2:
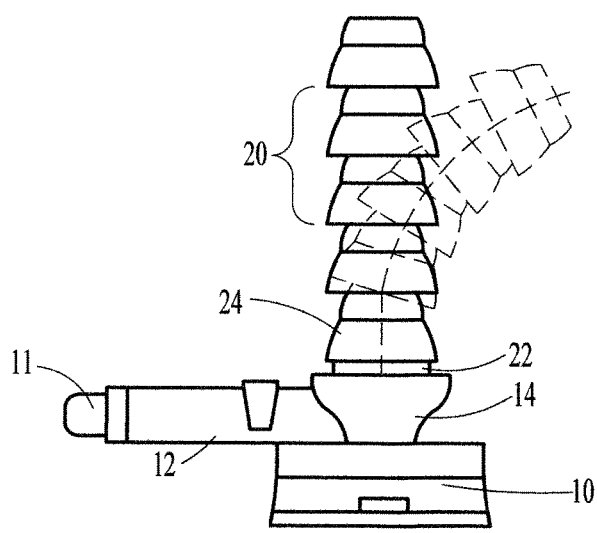
FIG. 2 is a front view of a lower portion of the flashlight mount of the present disclosure.
Figure 3:
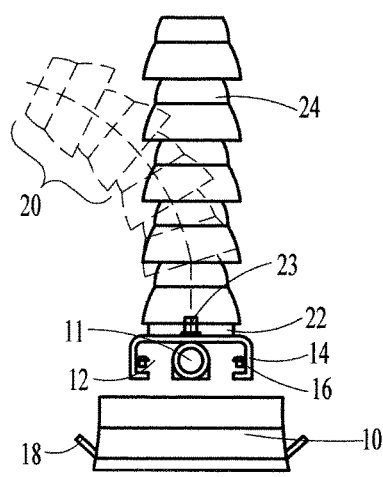
FIG. 3 is a side view of a lower portion of the flashlight mount of the present disclosure.

FIGS. 2 and 3 illustrate side and front views, respectively, of a lower portion of the flashlight mount. FIG. 2 illustrates section cup 10, vacuum pump 12, button 11, and base 14. FIG. 3 illustrates the flashlight mount turned 90 degrees counter-clockwise from FIG. 2 where the vacuum pump 12 and base 14 are shown in cross-section. For example, the suction cup base is the Wood's Powr-Grip Model TL3AMB1420T58L suction cup (Wood's Powr-Grip Co., Inc., Laurel, Mont.). This suction cup base allows the flashlight mount to be mounted to any smooth surface, wet or dry. The vacuum pump 12 allows for easy mounting and un-mounting, by pressing button 11 one or more times to increase the amount of suction between the suction cup and the surface to which it is being attached. Also shown are suction tab release tabs 18. As shown in FIG. 3, the base 14 is attached to the suction cup 10 with screws 16. The suction cup 10 is preferably 3" in diameter, but may be 3 to 10 inches.

The suction cup base piece 14 is attached to Loc-Line® fixed mount 22 (Lockwood Products, Inc., Lake Oswego, Oreg.) with a bolt or screw 23. A Loc-Line® modular hose piece (#69540) 24 is snapped onto the fixed mount 22. Successive pieces 24 are snapped onto the first piece to the desired length, preferably about 16", but may be 1 to 30 inches. The length of the assembly can be tailored to the user by adding or removing individual mast pieces 24 without tools. This configuration allows for an infinite rotation and poses. The dashed lines in FIGS. 2 and 3 illustrate the range of motion for the Loc-Line® mast 20 that is adjustable in 360 degrees around the vertical line extending upwards from base 10.

Figure 4:
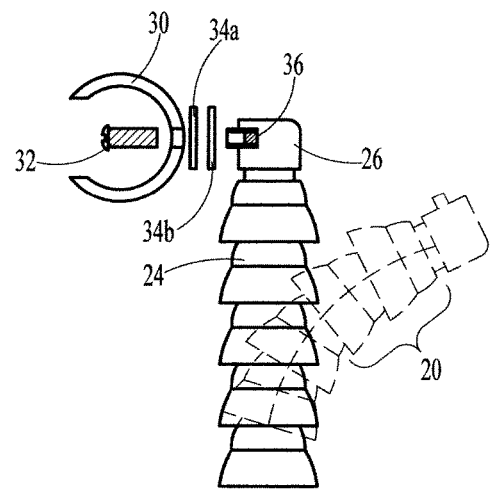
FIG. 4 is a side view of an upper portion of the flashlight mount of the present disclosure.

Referring now to FIG. 4, a Loc-Line® Shield Mounting Elbow (#60531) 26 terminates the mast assembly 20. Again, dashed lines indicate range of motion of the mast 20. Now, a key feature of the flashlight mount will be described. C-shaped clamp adaptor 30 is attached to the Loc-Line® shield elbow 26 with a screw 32 that passes through washers 34a and 34b and into PEM® insert 36 in the elbow 26. The PEM® (Penn Engineering, Danboro, Pa.) insert is a self-clinching threaded insert, part of the Loc-Line® system. Preferably, 34a is a neoprene washer and 34b is a nylon washer. The nylon washer 34b provides more surface area between the clamp adaptor 30 and the neoprene washer 34a which provides resistance to maintain the position of the clamp.

The clamp adaptor 30 attached to the mast 20 can rotate to 360 degrees with sufficient friction to maintain the desired positions. The clamp adaptor 30 rotates 360 degrees on the axis of the screw 32. The elbow 26 rotates 360 degrees on the axis of the mast assembly 20.

Figure 5:
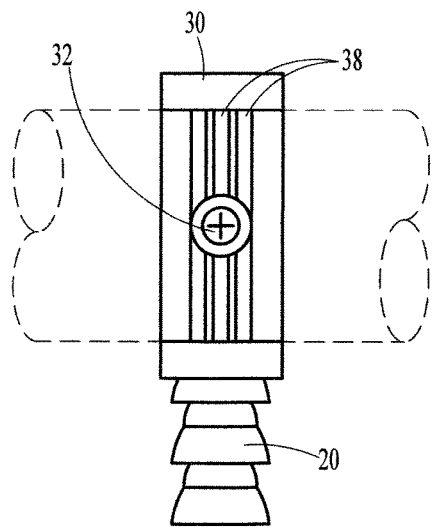
FIG. 5 is a front view of an upper portion of the flashlight mount of the present disclosure.

FIG. 5 shows the clamp adaptor 30 of FIG. 4 rotated counter-clockwise 90 degrees so that the screw 32 is seen head-on. Three slots 38 can be seen on the inner surface of the clamp adaptor 30. The slots extend along the entire inside surface of the clamp adaptor. More or fewer than 3 slots could be provided, but at least 3 slots is preferable.

Figure 6:
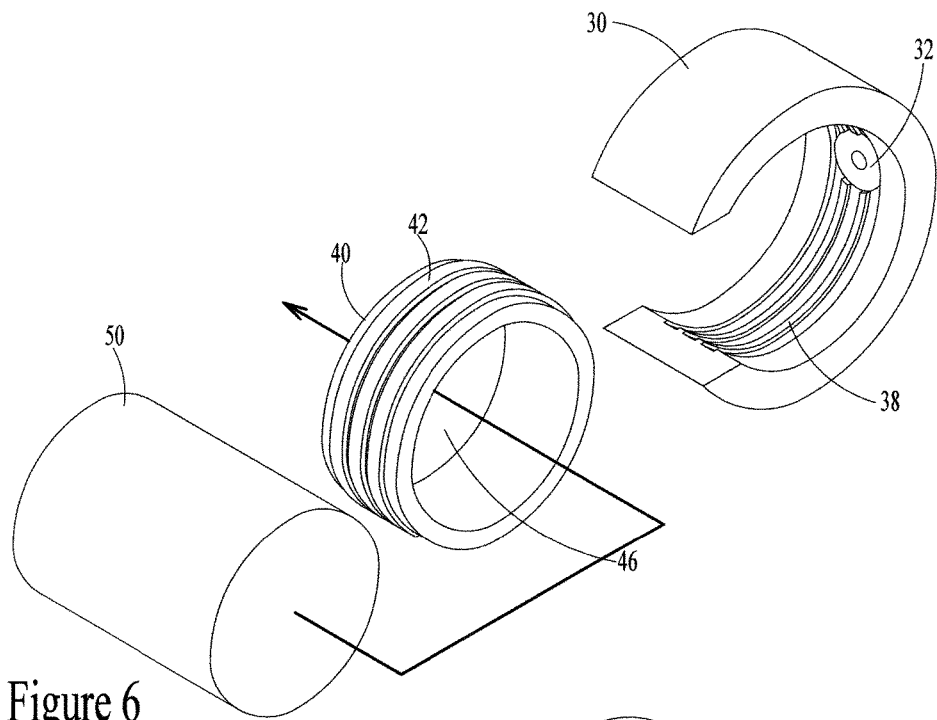
FIG. 6-8 are isometric views of the flashlight holder portion of the flashlight mount of the present disclosure.
Figure 7:
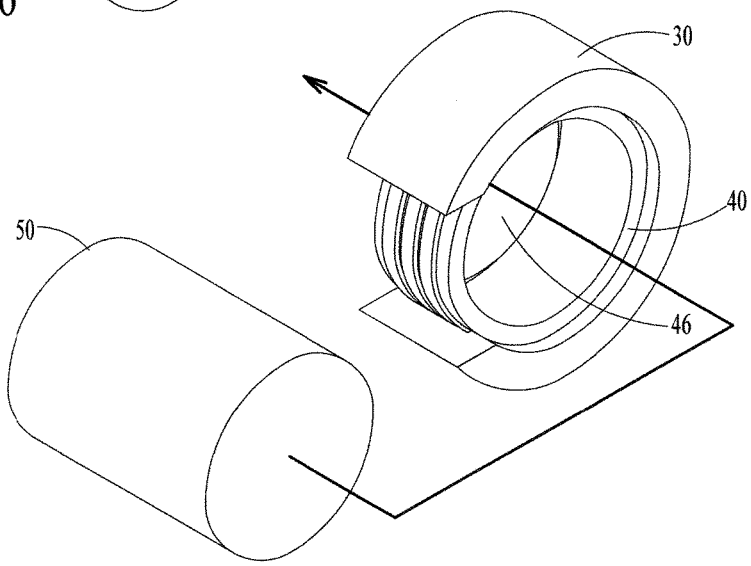
Figure 8:
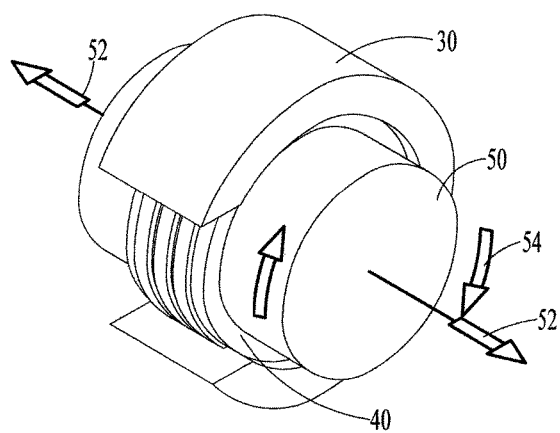

Referring now to FIGS. 6-8, it will be shown how a flashlight or work light is mounted into the assembly. It will be understood that other devices of similar shape could also be mounted into the assembly. These devices could be mirrors, clamping devices, and any other useful devices. FIG. 6 illustrates an inner ring 40. Opening 46 inside the inner ring has a diameter sufficient to receive a preferably 1" diameter flashlight. The opening can be made to have a different diameter as desired to fit lights of other diameters. If a larger diameter than 1" is needed for opening 46, the inner ring and clamp adaptor can be accordingly increased in size.

After the flashlight is inserted into the inner ring 40, the inner ring 40 is mounted into the clamp adaptor 30. Grooves 42 on the entire outside surface of the inner ring 40 interlock with the slots 38 on the inner surface of the clamp adaptor 30. The C clamp is precisely sized so the ring can be inserted into it through the opening (that is, the open side of the letter C). The C clamp flexes slightly to allow entry of the inner ring, but is otherwise a quite rigid plastic material.

FIG. 7 illustrates the inner ring 40 inserted into the clamp adaptor 30. The preferably three outer grooves on the inner ring are aligned with the corresponding grooves inside the clamp adaptor and the inner ring is snapped into the clamp adaptor using hand pressure. The inner ring will rotate 360 degrees with respect to the clamp adaptor with sufficient friction to maintain a desired position.

The clamp and ring are preferably manufactured by a machining process, but it is possible they could alternately be injection molded. For example, the material of the clamp and ring may be Delrin®, a highly-crystalline thermoplastic made by E. I. du Pont de Nemours and Company, Wilmington, Del. Preferably there are three matching grooves on the ring and clamp, but it is possible to have two or more than three grooves.

FIG. 8 illustrates the flashlight 50 inserted into the opening 46 in the inner ring 40. Arrows 52 illustrate the direction in which the flashlight is inserted. Arrows 54 illustrate the range of motion for the 360 degree rotation of the flashlight held by the inner ring. The flashlight and inner ring can easily be attached to and removed from the clamp adaptor.

Figure 9:
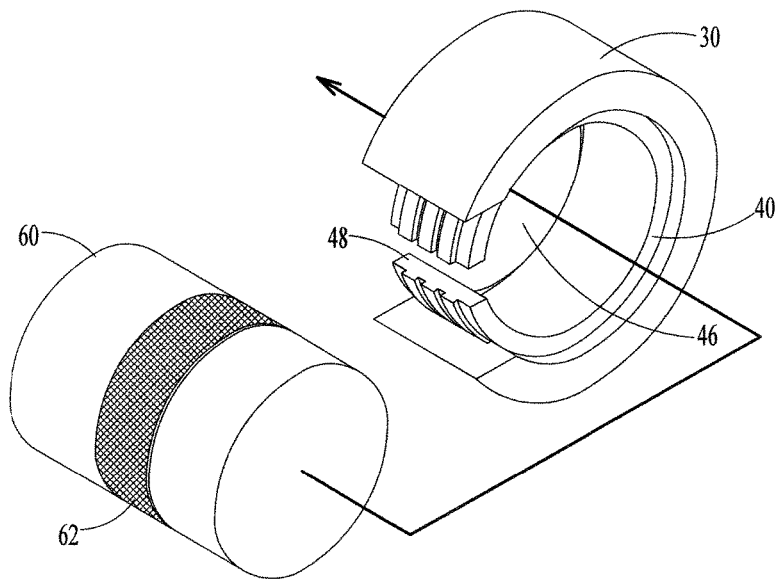
FIG. 9 is an isometric view of an alternative inner ring and flashlight in a preferred embodiment of the present disclosure.

The inner ring 40 can be either a solid piece, as shown in FIG. 8, or a solid piece with one horizontal slit all the way through one side of the inner ring so it can be expanded to slide over flashlights slightly larger than 1" in diameter or flashlights with slightly larger features on one end such as knurling. FIG. 9 illustrates inner ring 40 with a slit 48 and flashlight 60 with knurling 62, for example. The slit 48 may be about 1/32" to 1/16", for example.

Preferably, the flashlight is first inserted into the inner ring 40 and then the inner ring and flashlight together are inserted into the clamp adaptor. A slit in the inner ring allows insertion of a flashlight slightly larger than the diameter of the inner ring, for example, preferably up to 1/16" larger, or in a range of 5-10% larger.

Figure 10:
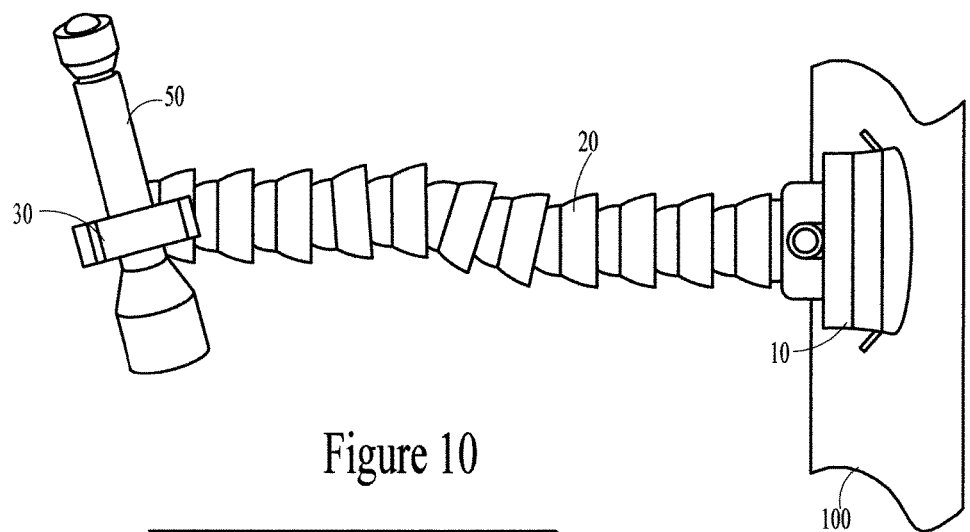
FIGS. 10 and 11 are front views of two preferred embodiments of the flashlight mount of the present disclosure.
Figure 11:
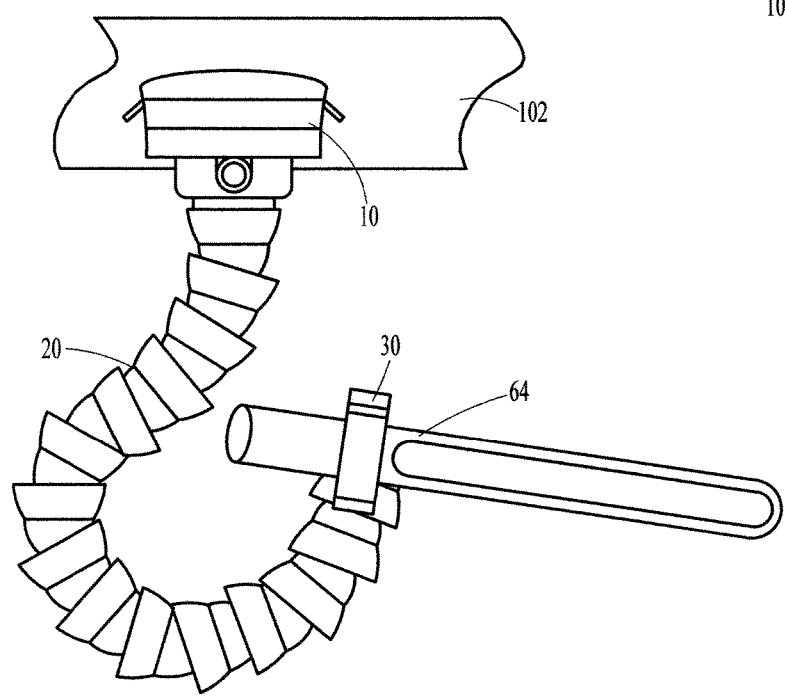

FIG. 10 illustrates a flashlight 50 held by the clamp 30. Mast 20 is in a vertical position. As shown in the figure, the suction cup 10 can be mounted onto a vertical surface 100. FIG. 11 illustrates a work light such as the Steelman® Pro work light #78606 (JS Products Inc., Las Vegas, Nev.) 64 held by the inner ring 40 in the clamp 30 of the flashlight mount. In this figure, the suction cup base 10 is mounted on an overhead horizontal surface 102. Mast 20 is shown in a bent position. It will be understood that the flashlight mount in FIGS. 10 and 11 may be positioned in any orientation. The suction cup base 10 may be mounted on any smooth surface, horizontal, vertical, or other orientation. The mast 20 can be bent in an infinite variety of positions. The elbow joint of the mast may rotate in 360 degrees with respect to the mast. The clamp adaptor 30 may rotate 360 degrees with respect to the elbow joint. The inner ring 40 may rotate 360 degrees with respect to the clamp. Any type of flashlight or work light or other device having a diameter equal to the inner ring diameter may be mounted within the disclosed flashlight mount.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:
1. A flashlight mount comprising:
 a modular, flexible mast configured to be positioned in one of a plurality of orientations;
 a clamp adaptor attached to an elbow joint at one end of said flexible mast wherein a plurality of inner grooves are formed vertically on an inside surface of said clamp adaptor wherein said elbow joint is rotatable relative to said flexible mast and wherein said clamp adaptor is rotatable relative to said elbow joint; and an inner ring configured to be mounted inside said clamp adaptor, said inner ring having:
a plurality of outer grooves formed vertically on an outside surface of said inner ring wherein said inner grooves and said outer grooves interlock; and
an opening in said inner ring having a first diameter configured to receive a device having a second diameter wherein said inner ring is rotatable with respect to said clamp adaptor.

2. The flashlight mount according to claim 1 further comprising a suction cup base attached to a second end of said flexible mast wherein said suction cup base is configured to be mounted to a smooth surface, which is wet or dry.

3. The flashlight mount according to claim 1 wherein said device having said second diameter equal to said first diameter is mounted into said inner ring.

4. The flashlight mount according to claim 1 wherein a horizontal slit all the way through one side of said inner ring allows mounting of said device having said second diameter five percent to ten percent larger than said first diameter.

5. The flashlight mount according to claim 2 wherein said suction cup base includes a vacuum pump for mounting said suction cup to a surface.

6. The flashlight mount according to claim 1 wherein said flexible mast is capable of being lengthened or shortened at any time without tools.

7. The flashlight mount according to claim 1 wherein said plurality of inner grooves and said plurality of outer grooves is three or more.

8. The flashlight mount according to claim 1 wherein said device comprises a flashlight, a work light, a mirror, or a clamping device.

9. The flashlight mount according to claim 1 wherein said elbow joint is rotatable 360 degrees relative to said flexible mast, said clamp adaptor is rotatable 360 degrees with respect to said elbow joint, and said inner ring is rotatable 360 degrees with respect to said clamp adaptor.

10. A method of fabricating a flashlight mount comprising:
attaching a first modular, flexible mast piece to a mast base piece;
attaching one or more second modular, flexible mast pieces to said first modular, flexible mast piece until a desired mast length is reached wherein said modular, flexible mast is configured to be positioned in one of a plurality of orientations;
thereafter attaching an elbow joint to a topmost piece of said second modular, flexible mast pieces wherein said elbow joint is rotatable with respect to said topmost second modular, flexible mast piece;
mounting a clamp adaptor to said elbow joint wherein a plurality of inner grooves are formed vertically on an inside surface of said clamp adaptor and wherein said clamp adaptor is rotatable with respect to said elbow joint; and
mounting an inner ring inside said clamp adaptor, said inner ring having:
a plurality of outer grooves formed vertically on an outside surface of said inner ring wherein said inner grooves and said outer grooves interlock; and
an opening in said inner ring having a first diameter configured to receive a device having a second diameter wherein said inner ring is rotatable with respect to said clamp adaptor.

11. The method according to claim 10 further comprising a suction cup base wherein said mast base piece is mounted on said suction cup base wherein said suction cup base is configured to be mounted to a smooth surface, which is wet or dry, and wherein said suction cup base further comprises a vacuum pump for mounting said suction cup to a surface.

12. The method according to claim 10 wherein said inner ring has a horizontal slit all the way through one side of said inner ring allowing mounting of said device having said second diameter 5-10% larger than said first diameter.

13. The method according to claim 10 wherein any of said second modular, flexible mast pieces are capable of being removed or added without tools.

14. The method according to claim 10 wherein said plurality of inner grooves and said plurality of outer grooves comprises three or more each of said inner and outer grooves.

15. A method of using a flashlight mount comprising:
providing a flashlight mount comprising:
a modular, flexible mast configured to be positioned in one of a plurality of orientations;
a clamp adaptor attached to an elbow joint at one end of said flexible mast wherein a plurality of inner grooves are formed vertically on an inside surface of said clamp adaptor wherein said elbow joint is rotatable in relative to said flexible mast and wherein said clamp adaptor is rotatable relative to said elbow joint; and
an inner ring configured to be mounted inside said clamp adaptor, said inner ring having:
a plurality of outer grooves formed vertically on an outside surface of said inner ring wherein said inner grooves and said outer grooves interlock; and
an opening in said inner ring having a first diameter configured to receive a device having a second diameter wherein said inner ring is rotatable with respect to said clamp adaptor;
shortening or lengthening said modular, flexible mast as desired;
thereafter mounting said flashlight mount onto a surface;
thereafter inserting a device into said opening in said inner ring; and
thereafter inserting said inner ring and said device together into said clamp adaptor.

16. The method according to claim 15 wherein said inner ring further comprises a horizontal slit all the way through one side of said inner ring allowing mounting of said device having said second diameter 5-10% larger than said first diameter.

17. The method according to claim 15 wherein said plurality of inner grooves and said plurality of outer grooves comprises three or more each of said inner and outer grooves.

18. The method according to claim 15 wherein said elbow joint is rotatable 360 degrees relative to said flexible mast, said clamp adaptor is rotatable 360 degrees with respect to said elbow joint, and said inner ring is rotatable 360 degrees with respect to said clamp adaptor.

19. The method according to claim 15 wherein said device comprises a flashlight, a work light, a mirror, or a clamping device.

20. The method according to claim 15 further comprising a suction cup base wherein a second end of said flexible mast is mounted on said suction cup base wherein said suction cup base is configured to be mounted to a smooth surface, which is wet or dry, and wherein said suction cup base further comprises a vacuum pump for mounting said suction cup to a surface.

\* \* \* \* \*